United States Patent
Giguère

(10) Patent No.: US 9,718,148 B2
(45) Date of Patent: Aug. 1, 2017

(54) GUIDING ASSEMBLY FOR A WORKPIECE CUTTING APPARATUS, WORKPIECE CUTTING APPARATUS INCLUDING THE SAME, AND METHOD FOR DISPLACING A CUTTING ASSEMBLY ALONG A WORKPIECE CUTTING TABLE

(71) Applicant: Machitech Automation, Saint-Marc-des-Carrières (CA)

(72) Inventor: Jean-François Giguère, Saint-Raymond (CA)

(73) Assignee: Machitech Automation, Saint-Marc-des-Carrieres (CA)

( * ) Notice: Subject to any disclaimer, the term of this patent is extended or adjusted under 35 U.S.C. 154(b) by 337 days.

(21) Appl. No.: 14/454,396

(22) Filed: Aug. 7, 2014

(65) Prior Publication Data
US 2016/0039048 A1    Feb. 11, 2016

(51) Int. Cl.
*B23K 9/00*  (2006.01)
*B23K 26/38*  (2014.01)
(Continued)

(52) U.S. Cl.
CPC .............. *B23K 26/38* (2013.01); *B23K 10/00* (2013.01); *B23K 26/0884* (2013.01);
(Continued)

(58) Field of Classification Search
CPC .... B23K 26/0876; B23K 10/00; B23K 26/38; B24C 1/045; B24C 3/04
(Continued)

(56) References Cited

U.S. PATENT DOCUMENTS 2,631,028 A    3/1953    Murr
4,375,195 A    3/1983    Tsuboi
(Continued)

FOREIGN PATENT DOCUMENTS

WO    2013073962 A2    5/2013

OTHER PUBLICATIONS

Plasma Cutting System, Baykal Model BPL-H, Fab-Line Machinery—Press Brakes, Mar. 13, 2014, 9 pages, http://www.fab-line.com/products/plasma-cutting-system-model-bpl-h/.
(Continued)

*Primary Examiner* — Thien S Tran
(74) *Attorney, Agent, or Firm* — Price Heneveld LLP

(57) ABSTRACT

A workpiece cutting apparatus includes a cutting table with a workpiece receiving surface, at least two longitudinally-extending rails extending longitudinally on opposed sides of the cutting table and substantially parallel to one another, a bridge with an elongated cutting assembly support and engagement arms at opposed ends thereof, and at least two driving assemblies. Each one of the engagement arms includes a bridge engagement member engageable with a corresponding one of the at least two longitudinally-extending rails, from below. Each one of the driving assemblies operatively connects each one of the engagement arms to the corresponding one of the at least two longitudinally-extending rails. The at least two driving assemblies are actuable to translate the engagement arms along the at least two longitudinally-extending rails. A method of cutting a workpiece using the workpiece cutting apparatus and a method for assembling a workpiece cutting apparatus are also provided.

28 Claims, 8 Drawing Sheets

(51) Int. Cl.
*B24C 1/04* (2006.01)
*B24C 3/04* (2006.01)
*B23K 10/00* (2006.01)
*B23K 37/02* (2006.01)
*B23K 26/08* (2014.01)
*B26F 3/00* (2006.01)
*B23K 101/18* (2006.01)

(52) U.S. Cl.
CPC .......... *B23K 37/0235* (2013.01); *B24C 1/045* (2013.01); *B24C 3/04* (2013.01); *B26F 3/00* (2013.01); *B23K 2201/18* (2013.01)

(58) Field of Classification Search
USPC ............ 219/121.39, 121.44, 121.67, 121.74, 219/121.78, 121.83; 384/44, 45
See application file for complete search history.

(56) References Cited

U.S. PATENT DOCUMENTS

| | | | |
|---|---|---|---|
| 5,088,181 A | 2/1992 | Jeppsson | |
| 5,360,271 A | 11/1994 | Agari | |
| 5,854,460 A * | 12/1998 | Graf | B23K 26/0884 219/121.67 |
| 6,158,890 A | 12/2000 | Hattori | |
| 6,222,155 B1 | 4/2001 | Blackmon et al. | |
| 6,372,179 B1 | 4/2002 | Marcato | |
| 7,819,584 B2 | 10/2010 | Michioka et al. | |
| 8,206,036 B2 | 6/2012 | Kuwabara | |
| 8,365,714 B2 | 2/2013 | Gifford et al. | |
| 8,490,268 B2 | 7/2013 | Plüss | |
| 8,544,372 B2 | 10/2013 | Economaki | |
| 2005/0172764 A1 * | 8/2005 | Fagan | B23K 7/105 83/13 |
| 2005/0269302 A1 | 12/2005 | Horn | |
| 2006/0260425 A1 | 11/2006 | Mizumura et al. | |
| 2006/0288838 A1 * | 12/2006 | Lisec | B65G 49/067 83/879 |
| 2008/0295820 A1 * | 12/2008 | Gifford | B23D 47/02 125/13.01 |
| 2011/0232442 A1 * | 9/2011 | Guglielmetti | B26D 5/005 83/53 |
| 2012/0160816 A1 | 6/2012 | Hubert | |

OTHER PUBLICATIONS

Techno CNC Routers, New HPLC Series CNC Plasma Cutter, Aug. 18, 2014, 2 pages, http://www.technocnc.com/cnc-router-press-releases/HPLC-cnc-plasma-cutter.htm.

* cited by examiner

GUIDING ASSEMBLY FOR A WORKPIECE CUTTING APPARATUS, WORKPIECE CUTTING APPARATUS INCLUDING THE SAME, AND METHOD FOR DISPLACING A CUTTING ASSEMBLY ALONG A WORKPIECE CUTTING TABLE

FIELD OF THE INVENTION

The present invention relates to the field of workpiece cutting apparatuses. More particularly, it relates to a guiding assembly for a workpiece cutting table and a workpiece cutting apparatus including a guiding assembly. It also relates to a method for displacing a cutting assembly along a workpiece cutting table.

BACKGROUND OF THE INVENTION

Several types of cutting apparatuses including a cutting table and operative to perform the cutting of workpieces, such as metal sheets, are known in the art, where a numerically controlled cutting assembly is moved over the cutting table holding the workpiece in order to perform the cutting/machining of pieces therein.

In many instances, in order to allow movement of the cutting assembly at least in an X-Y plane, the cutting apparatus includes a bridge movable about the cutting table. The cutting assembly is connected to the bridge such as to move about the bridge along at least one axis and the bridge is movable about the cutting table, along a second perpendicular axis. In order to move the bridge, it is known to use wheels rolling on rails mounted to a mounting surface, such as the ground or the sides of the cutting table.

In apparatuses operating as described above, the upper surface of the rails is exposed to the external environment, which may negatively impact the precision of the displacement of the bridge. For example and without being limitative, dust and debris generated by the cutting of the metal sheet can gather on the upper surface of the rails and/or the upper surface of the rails can be physically damaged as a result of impact with external elements, thereby negatively affecting the uniformity of the rolling surface and consequently reducing the precision of the displacement of the bridge thereabout.

In view of the above, there is a need for an improved cutting apparatus for cutting workpieces and method which, by virtue of its design and components, would be able to overcome or at least minimize some of the above-discussed prior art concerns.

SUMMARY OF THE INVENTION

According to a first general aspect, there is provided a workpiece cutting apparatus. The workpiece cutting apparatus comprises a cutting table with a workpiece receiving surface and at least two longitudinally-extending rails extending longitudinally on opposed sides of the cutting table and extending substantially parallel to one another. Each one of the longitudinally-extending rails has a rail engagement surface oriented substantially downwardly. The workpiece cutting apparatus also comprises a bridge with an elongated cutting assembly support and engagement arms extending at opposed ends of the elongated cutting assembly support. Each one of the engagement arms comprises a bridge engagement member engageable with a corresponding one of the at least two longitudinally-extending rails, from below, to perform longitudinal displacement of the bridge along the longitudinally-extending rails. The workpiece cutting apparatus further comprises at least two driving assemblies. Each one of the driving assemblies operatively connects each one of the engagement arms to the corresponding one of the at least two longitudinally-extending rails. The at least two driving assemblies are actuable to translate the engagement arms along the at least two longitudinally-extending rails.

In an embodiment, the cutting table comprises side surfaces extending downwardly from the workpiece receiving surface and the at least two longitudinally-extending rails are connected to opposed one of the side surfaces of the cutting table, below the workpiece receiving surface.

In an embodiment, the workpiece cutting apparatus further comprises rail supports having a lower surface, the rail supports are mounted to a respective one of the side surfaces and extend outwardly therefrom. The rail supports also extend below the workpiece receiving surface. The at least two longitudinally-extending rails are secured to the lower surface of the respective one of the rail supports.

In an embodiment, the workpiece cutting apparatus further comprises a supporting surface supporting the cutting table and extending below the workpiece receiving surface. The at least two longitudinally-extending rails are secured to the supporting surface, on opposite sides of the cutting table.

In an embodiment, the workpiece cutting apparatus further comprises a controller operatively connected to the at least two driving assemblies to synchronize a displacement direction and speed of the engagement arms along the at least two longitudinally-extending rails.

In an embodiment, the workpiece cutting apparatus further comprises a cutting assembly mounted to the elongated cutting assembly support of the bridge and displaceable therealong, above the workpiece receiving surface.

In an embodiment, the cutting assembly is one of a plasma torch, a water jet and a laser.

In an embodiment, the engagement arms comprises a first section extending downwardly from the elongated cutting assembly support and a second section extending inwardly from a lower end of the first section towards the cutting table. Each one of the bridge engagement members is mounted to a respective one of the second sections of the engagement arms.

In an embodiment, the bridge engagement members extend upwardly from the second sections of the engagement arms.

According to another general aspect, there is also provided a workpiece cutting apparatus. The workpiece cutting apparatus comprises a cutting table having a workpiece receiving surface, at least two longitudinally-extending rails provided on opposed sides of the cutting table, a bridge having a cutting assembly mounted to a section thereof and being operatively engageable with the at least two longitudinally-extending rails, from below, and at least two driving assemblies. Each one of the driving assemblies operatively connects a respective end of the bridge to each one of the at least two longitudinally-extending rails. The at least two driving assemblies are actuable to perform longitudinal displacement of the bridge along the at least two longitudinally-extending rails and above the workpiece receiving surface.

In an embodiment, the at least two longitudinally-extending rails extend substantially parallel to one another and comprise a rail engagement surface oriented substantially downwardly.

In an embodiment, the bridge comprises an elongated cutting assembly support, with the cutting assembly being operatively connected thereto, and engagement arms extending at opposed ends of the elongated cutting assembly support. Each one of the engagement arms comprises a bridge engagement member being engageable with a corresponding one of the at least two longitudinally-extending rails, from below.

In an embodiment, the engagement arms comprise a first section extending downwardly from the elongated cutting assembly support and a second section extending inwardly from a lower end of the first section towards the cutting table, each one of the bridge engagement members being mounted to a respective one of the second sections of the engagement arms.

In an embodiment, the bridge engagement members extend upwardly from the second sections of the engagement arms.

In an embodiment, the cutting table comprises side surfaces extending downwardly from the workpiece receiving surface and the at least two longitudinally-extending rails are connected to opposed one of the side surfaces of the cutting table, below the workpiece receiving surface.

In an embodiment, the workpiece cutting apparatus further comprises rail supports having a lower surface, the rail supports are mounted to a respective one of the side surfaces and extend outwardly therefrom. The rail supports extend below the workpiece receiving surface. The at least two longitudinally-extending rails are secured to the lower surface of the respective one of the rail supports.

In an embodiment, the workpiece cutting apparatus further comprises a supporting surface supporting the cutting table and extending below the workpiece receiving surface. The at least two longitudinally-extending rails are secured to the supporting surface, on opposite sides of the cutting table.

In an embodiment, the workpiece cutting apparatus further comprises a controller operatively connected to the at least two driving assemblies to synchronize a displacement direction and speed of the respective ends of the bridge along the at least two longitudinally-extending rails.

In an embodiment, the cutting assembly is one of a plasma torch, a water jet and a laser.

According to another general aspect, there is also provided a method for cutting a workpiece using a cutting apparatus as described above. The method comprises the steps of: positioning the workpiece on the receiving surface of the cutting table; displacing the cutting assembly along at least a first axis about the bridge; displacing the bridge along a second axis about the at least two longitudinally-extending rails; and cutting the workpiece while displacing at least one of the cutting assembly and the bridge. The displacement of the bridge is performed by engaging the respective ends of the bridge respectively with a corresponding one of the at least two longitudinally-extending rails, from below, and driving each one of the respective ends of the bridge in a displacement direction using the corresponding one of the driving assemblies.

According to another general aspect, there is also provided a method for assembling a workpiece cutting apparatus. The method comprises the steps of: providing a cutting table having a workpiece receiving surface; configuring the cutting table to space apart the workpiece receiving surface from a supporting surface; mounting longitudinally-extending rails having an engagement surface close to the cutting table with the engagement surfaces of the longitudinally-extending rails facing downwardly and the longitudinally-extending rails being spaced-apart from one another and extending substantially parallel to one another; engaging bridge engagement members of a bridge with each one of the longitudinally-extending rails to form bridge engagement member and rail assemblies, with the bridge extending above the workpiece receiving surface of the cutting table; and engaging driving assemblies with each one of the bridge engagement members and rail assemblies, the driving assemblies being actuable to engage the bridge in translation along the longitudinally-extending rails.

In an embodiment, mounting the longitudinally-extending rails comprises mounting the longitudinally-extending rails to the cutting table on a respective side thereof.

In an embodiment, the method further comprises mounting a cutting assembly on an elongated cutting assembly support of the bridge.

In an embodiment, the method further comprises connecting each one of the driving assemblies to a controller to synchronize actuation of the driving assemblies and displacement of the bridge engagement members along the longitudinally-extending rails in a same direction and at a same speed.

BRIEF DESCRIPTION OF THE DRAWINGS

Other objects, advantages and features will become more apparent upon reading the following non-restrictive description of embodiments thereof, given for the purpose of exemplification only, with reference to the accompanying drawings in which.

DETAILED DESCRIPTION OF THE PREFERRED EMBODIMENTS

In the following description, the same numerical references refer to similar elements. The embodiments, geometrical configurations, materials mentioned and/or dimensions shown in the figures or described in the present description are embodiments only, given solely for exemplification purposes.

Moreover, although the embodiments of the cutting apparatus and corresponding parts thereof consist of certain geometrical configurations as explained and illustrated herein, not all of these components and geometries are essential and thus should not be taken in their restrictive sense. It is to be understood, as also apparent to a person skilled in the art, that other suitable components and cooperation thereinbetween, as well as other suitable geometrical configurations, may be used for the cutting apparatus, as will be briefly explained herein and as can be easily inferred herefrom by a person skilled in the art. Moreover, it will be appreciated that positional descriptions such as "above", "below", "left", "right" and the like should, unless otherwise indicated, be taken in the context of the figures and should not be considered limiting.

Figure 1:
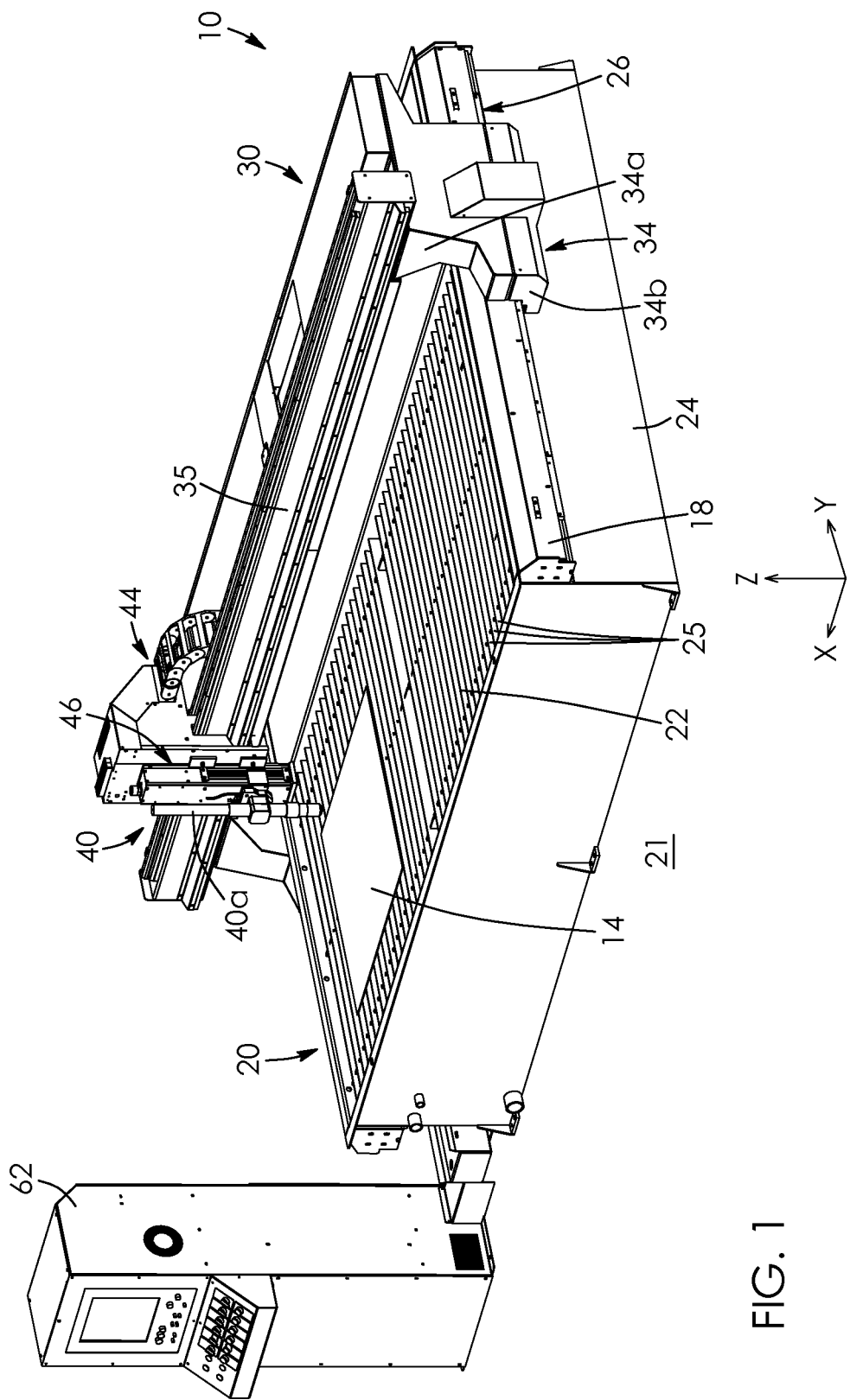
FIG. 1 is a perspective view of a workpiece cutting apparatus including a workpiece cutting table, in accordance with an embodiment.

Referring to FIG. 1, in accordance with one embodiment, there is provided a cutting apparatus 10 for cutting workpieces. The cutting apparatus 10 includes a workpiece cutting table 20, a bridge (or carriage) 30 displaceable longitudinally about the cutting table 20 through a guiding assembly 23, and a cutting assembly 40 mounted to an elongated cutting assembly support 35 of the bridge 30 and displaceable thereabout. The cutting assembly 40 is translatable transversally along the elongated cutting assembly support 35 of the bridge 30 according to at least a first axis X and the bridge 30 is movable longitudinally about the cutting table 20, according to a second axis Y, substantially perpendicular to the first axis X, such as to allow displacement of the cutting assembly 40 in at least an X-Y plan.

The cutting table 20 is supported on a supporting surface 21, such as a floor, and includes a flat upper workpiece receiving surface 22 distal from the supporting surface 21. In the embodiment shown, side surfaces 24 extend downwardly from the workpiece receiving surface 22 and support same on and above the supporting surface 21. In the embodiment shown, the workpiece receiving surface 22 is defined by a plurality of slats 25, longitudinally spaced apart from one another and substantially leveled horizontally. One skilled in the art will understand that, in alternative embodiments, the workpiece receiving surface 22 can however be defined by a different type of substantially flat surface, such as, for example and without being limitative, a smooth surface, a perforated surface or the like. Workpieces 14 to be cut, for example metal sheets or the like, are placed on the workpiece receiving surface 22 of the cutting table 20 and the cutting assembly 40 is displaced with respect to the workpiece 14 through the combined displacement of the cutting assembly 40 along the elongated cutting assembly support 35 and the bridge 30 along the cutting table 20. In an embodiment (not shown), the cutting table 20 can include workpiece fixation members for temporarily holding the workpieces against the workpiece receiving surface 22 of the cutting table 20.

Figure 2:
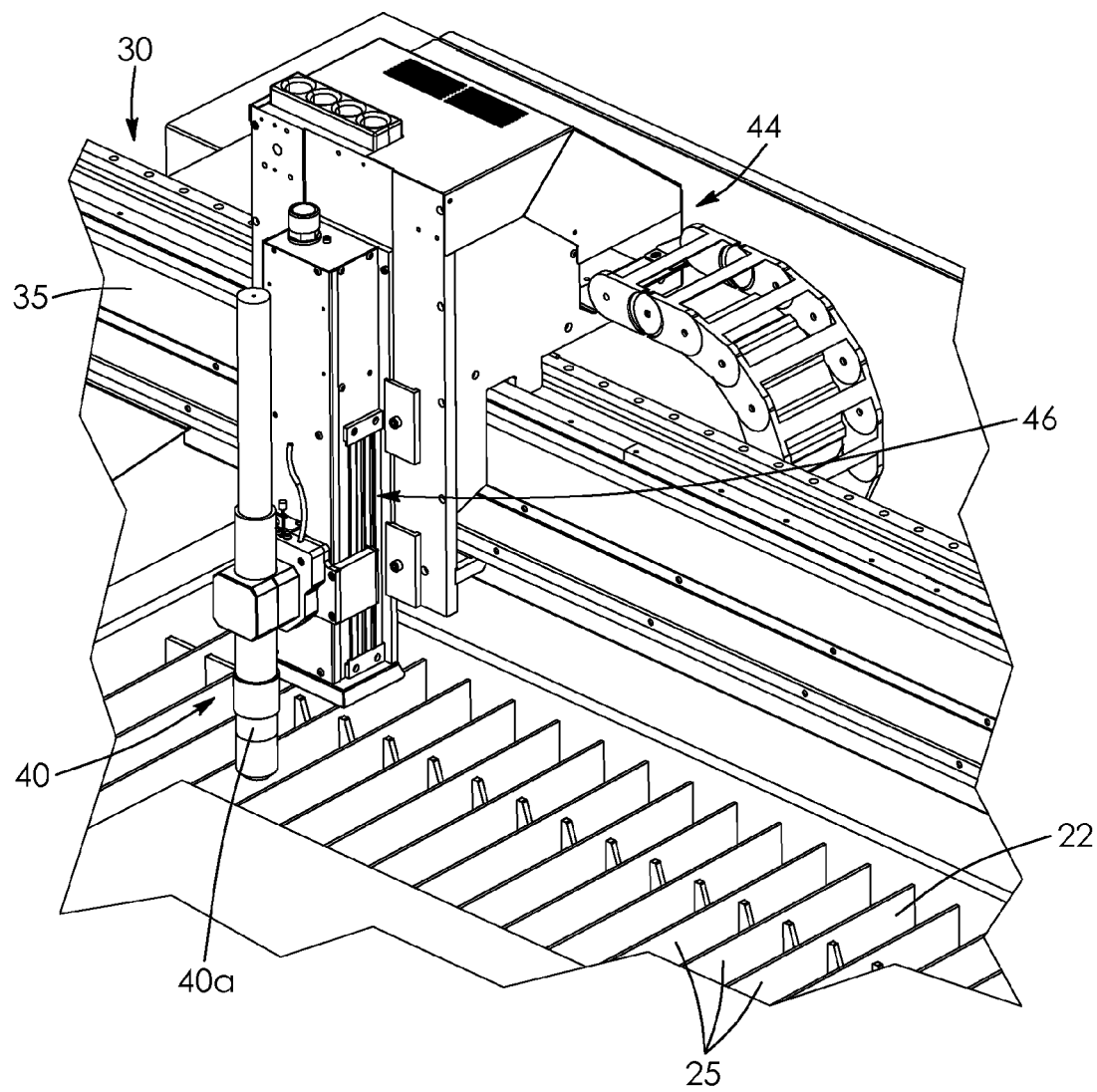
FIG. 2 is a right side close-up perspective view of a cutting assembly mounted to a bridge of the workpiece cutting apparatus of FIG. 1.
Figure 3:
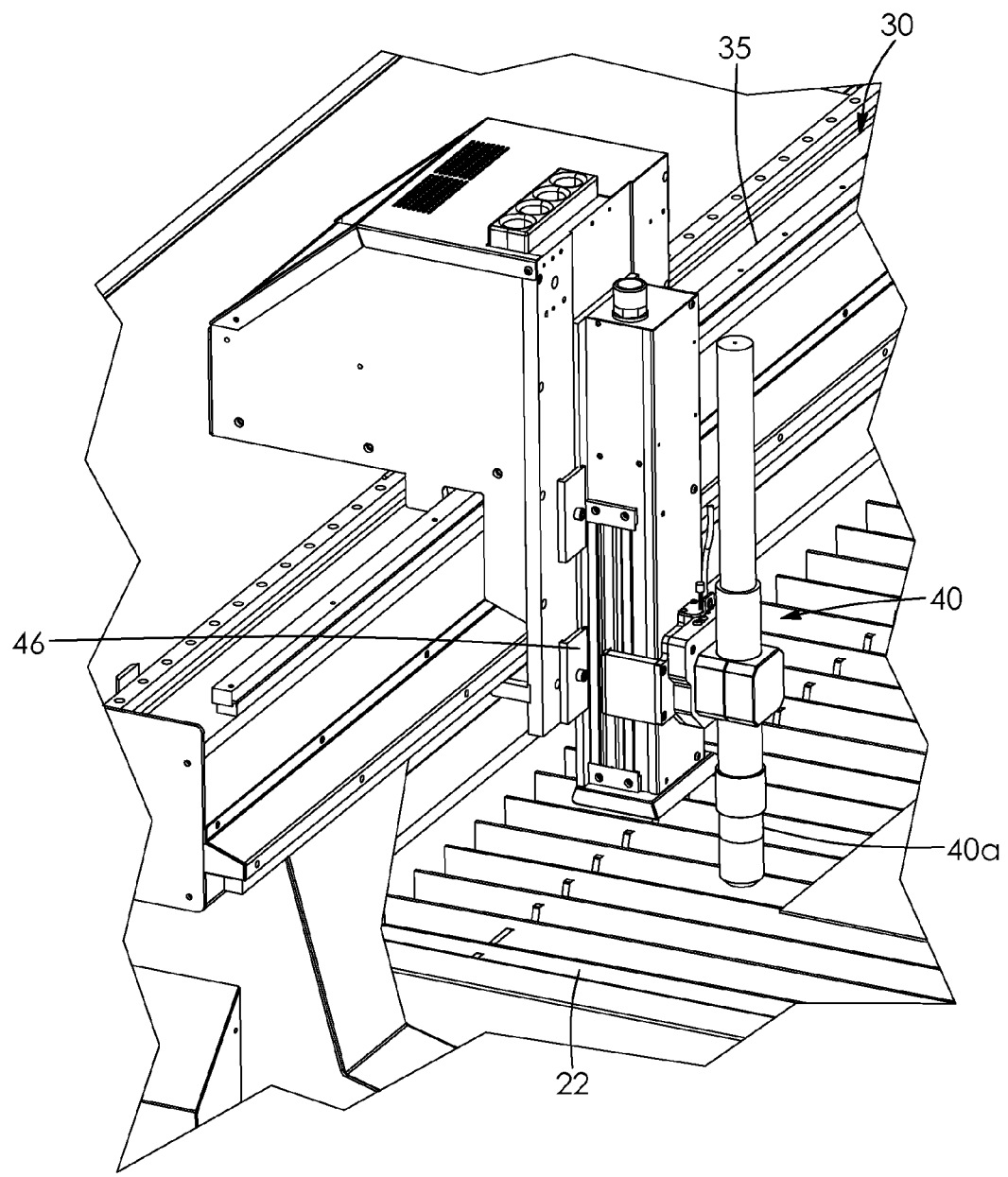
FIG. 3 is a left side close-up perspective view of the cutting assembly mounted to the bridge of the workpiece cutting apparatus of FIG. 2.

Now referring to FIGS. 1 to 3, in order to perform cutting of the workpiece, as mentioned above, the cutting assembly 40 is displaceable over the workpiece receiving surface 22 of the cutting table 20. In the embodiment shown, the cutting assembly 40 is operatively connected to the elongated cutting assembly support 35 of the bridge 30, such as to be displaceable and, more particularly, translatable along this longitudinal section of the bridge 30, according to the first axis X. In the embodiment shown, the cutting assembly 40 is further displaceable about the elongated cutting assembly support 35 of the bridge 30 according to a substantially vertical axis Z. In order to perform displacement of the cutting assembly 40, the cutting apparatus 10 includes an X-axis actuator 44 and a Z-axis actuator. Each one of the X-axis actuator 44 and the Z-axis actuator 46 are of types well known in the art, such as without being limitative, leadscrews, ball screws, rack and pinion, belt drive or the like. Each one of the X-axis actuator 44 and the Z-axis actuator 46 is controlled by a controller 62, as will be described in more details below. One skilled in the art will understand that, in an alternative embodiment, the cutting assembly 40 could be displaceable only according to the X-axis.

In the illustrated embodiment, the cutting assembly 40 includes a plasma torch 40a to perform the cutting of the workpieces. However one skilled in the art will understand that, in alternative embodiments, the cutting assembly 40 could include a different type of cutting assembly such as, for example and without being limitative a water jet mechanism, a laser mechanism or other known mechanisms operative to perform the cutting of workpieces.

Figure 4:
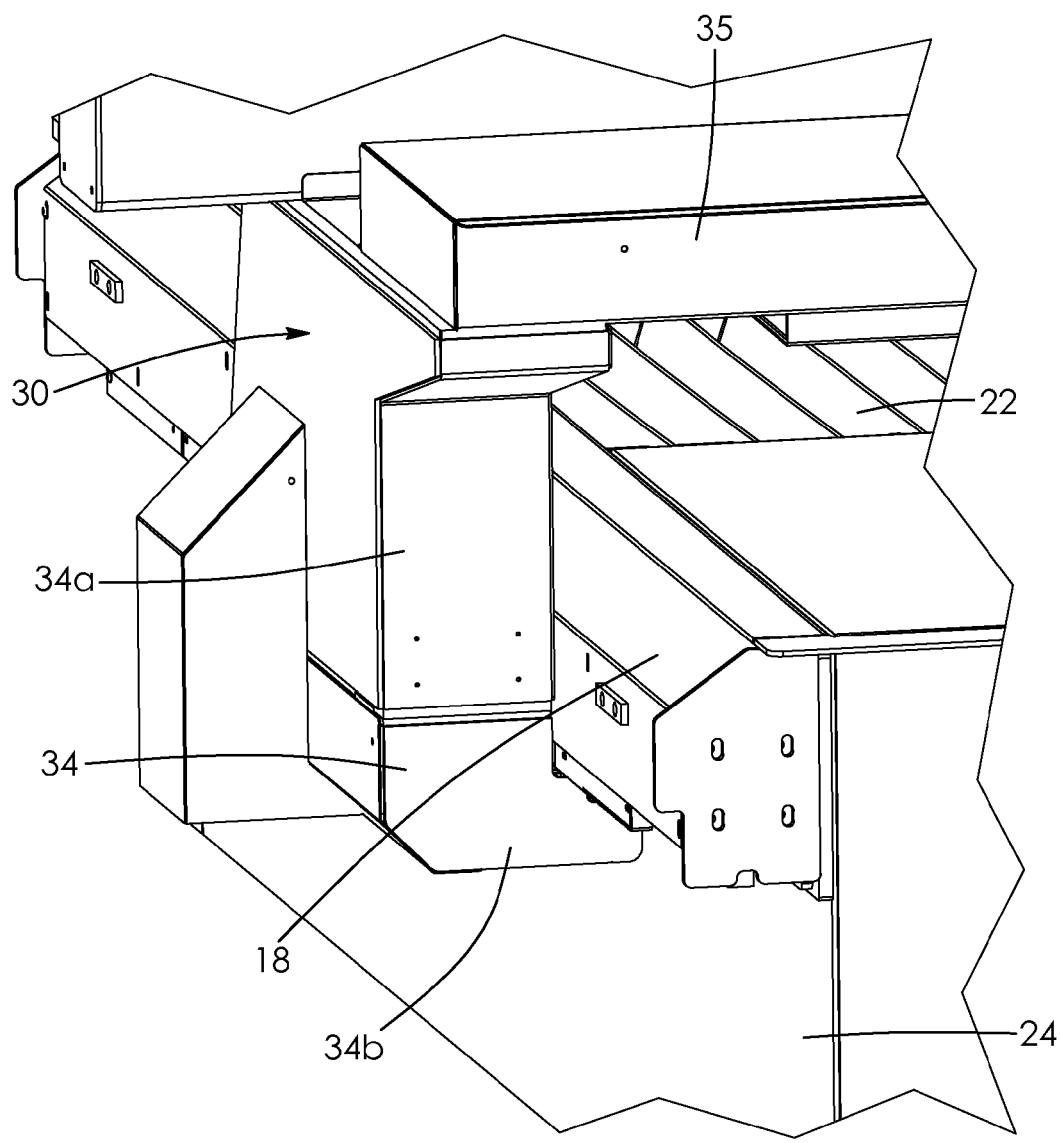
FIG. 4 is a close-up perspective view of a section of an engagement arm of a bridge of the workpiece cutting apparatus of FIG. 1.
Figure 5:
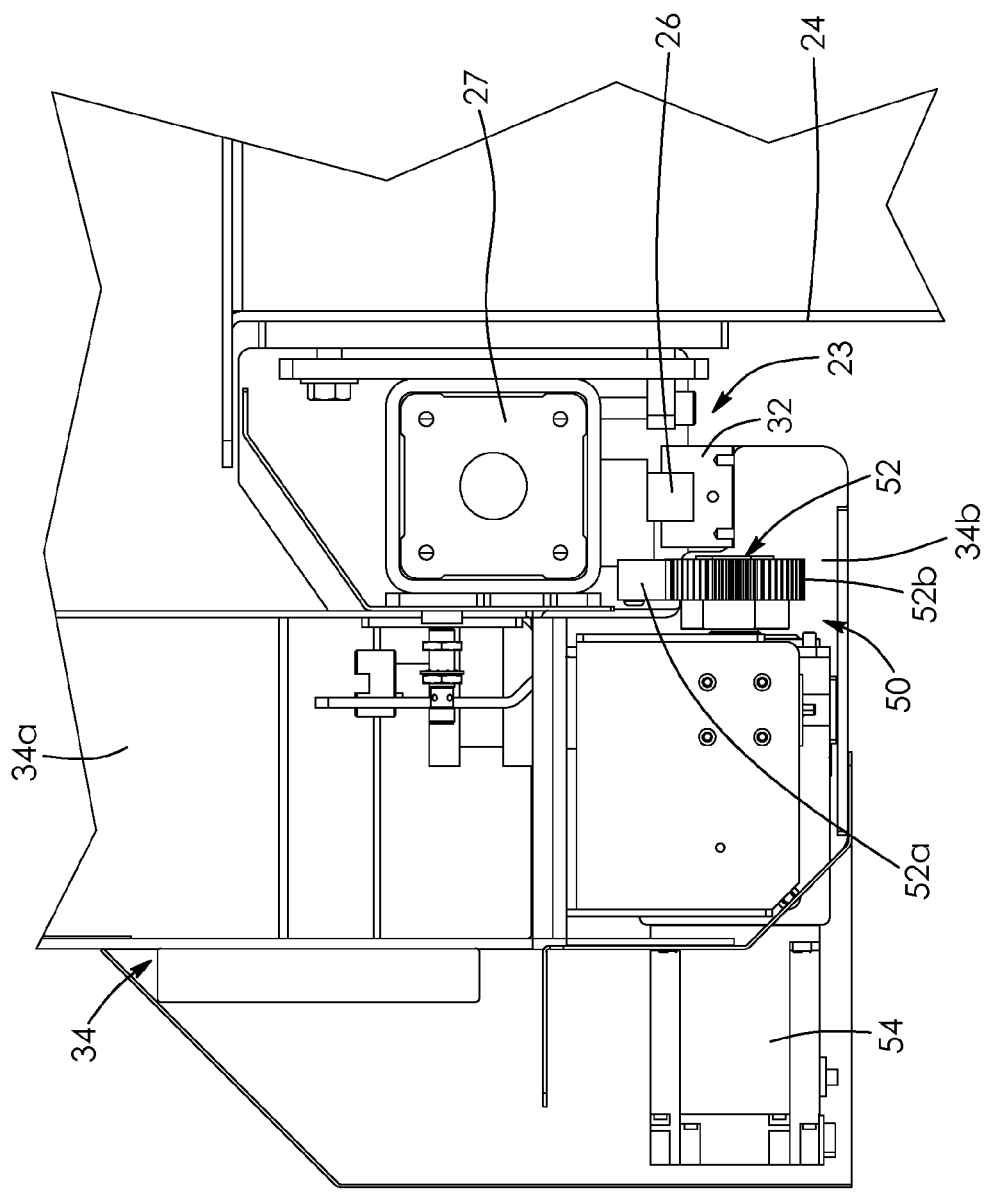
FIG. 5 is a side elevation view of the engagement arm of the cutting apparatus of FIG. 4, wherein a cover has been removed.

Referring now to FIGS. 1, 4 and 5, as mentioned above, displacement of the cutting assembly 40 along the Y-axis is performed by displacement of the bridge 30 longitudinally along the cutting table 20. In order to allow such displacement of the bridge 30, in an embodiment, the cutting apparatus 10 also includes a guiding assembly 23 with two longitudinally-extending rails 26. One skilled in the art will however understand that, in an alternative embodiment, more than two longitudinally-extending rails 26 could also be provided. The longitudinally-extending rails 26 extend longitudinally on opposite sides of the cutting table 20, for example and without being limitative, on the left and right sides of the cutting table 20. In an embodiment, the longitudinally-extending rails 26 extend substantially horizontally and substantially parallel to the corresponding side surface 24 of the cutting table 20.

Each longitudinally-extending rail 26 is supported by a rail support 27 configured to mount the rail 26 to a corresponding supporting element and maintain the longitudinally-extending rail 26 in a stable configuration along a length of the cutting table 20. In the embodiment shown, the longitudinally-extending rails 26 are mounted to the cutting table 20 through securement to a lower surface of the rail supports 27, the rail supports 27 being in turn secured to a corresponding side surface 24 of the cutting table 20. One skilled in the art will understand that, in an alternative embodiment (not shown), the longitudinally-extending rails 26 could however be mounted to a supporting element distinct than the cutting table 20, such as, for example and without being limitative, the supporting surface 21 or any other suitable stable support element, to extend longitudinally on opposite sides of the cutting table 20.

In the embodiment shown, each longitudinally-extending rail 26 is covered by a protective cover 18 extending above the rail 26, over an entire length thereof. A lower portion of the protective cover 18 is open to allow engagement of the bridge 30 with the longitudinally-extending rail 26, as will be described in more details below.

More particularly, referring to FIGS. 1 and 4, the bridge 30 comprises two engagement arms 34, having a first section 34a extending downwardly from opposed ends of the elongated cutting assembly support 35. Each one of the engagement arm 34 of the bridge 30 comprises a portion of the guiding assembly 23, engageable with a corresponding one of the longitudinally-extending rails 26 to allow longitudinal displacement of a corresponding end of the bridge 30 along the length of the corresponding longitudinal rail 26. The first section 34a of the engagement arms 34 extend substantially vertically on opposed sides of the cutting table 20, such that, the bridge 30 is connected to a corresponding one of the longitudinally-extending rails 26 on each opposed side of the cutting table 20 where the longitudinally-extending rails 26 are provided. One skilled in the art will understand that the engagement and operative connection between each one of the engagement arm 34 and the corresponding longitudinally-extending rail 26 is similar.

The engagement arms 34 are configured to be displaced along the longitudinally-extending rails 26 simultaneously, in the same direction, and at the same speed. Therefore, the engagement and operative connection between only one of the engagement arms 34 and the corresponding longitudinally-extending rail 26 will be described below. The two engagement arms 34 are free of connection member therebetween below the workpiece receiving surface 22 of the cutting table 20. In the embodiment shown, the two engagement arms 34 are solely connected to one another through the elongated cutting assembly support 35 extending above the cutting table 20 and, indirectly, through the longitudinally-extending rails 26 and the cutting table 20. As mentioned above, the engagement arms 34 are configured to be displaced along the longitudinally-extending rails 26 simultaneously in the same direction and at the same speed. As will described in more details below, each one of the engagement arms 34 is independently driven in translation along the corresponding one of the longitudinally-extending rails 26.

Referring to FIGS. 4 and 5, each longitudinally-extending rail 26 has a rail engagement surface 28 to engage a bridge engagement member 32 of the engagement arm 34 of the bridge 30 and allow displacement of the corresponding end of the bridge 30 along the length of the corresponding longitudinally-extending rail 26. In the embodiment shown, the bridge engagement member 32 of the engagement arm 34, which is part of the guiding assembly 23, is provided at a distal end of a second section 34b of the engagement arm 34. In the embodiment shown, the second section 34b of the engagement arm 34 extends horizontally and inwardly from a lower end of the first section 34a, i.e. towards the cutting table 20. However, in an alternative embodiment, the longitudinally-extending rails 26 can be engaged by a section of the engagement arm 34 which extends outwardly from the cutting table 20. As can be seen, the rails 26 are inverted, relative to a normal upward-facing configuration, such that the engagement surface 28 is oriented substantially downwardly, i.e. the engagement surface 28 faces substantially away from the workpiece receiving surface 22 of the cutting table 20. To be engageable with the downwardly oriented engagement surface 28, the bridge engagement member 32 comprises a rail engaging surface facing upwardly.

In the embodiment shown, the engagement member 32 of the engagement arm 34 engages the engagement surface 28 of the rail 26, from below, to perform the displacement of the elongated cutting assembly support 35 of the bridge, and the cutting assembly 40 mounted thereto, above the workpiece receiving surface 22 of the cutting table 20 and the longitudinally-extending rails 26. In an embodiment, bearing assemblies (not shown) are provided between the engagement surface 28 of the rail and the engagement member 32 of the engagement arm 34 to reduce friction between these components and provide free linear movement therebetween.

Figure 6:
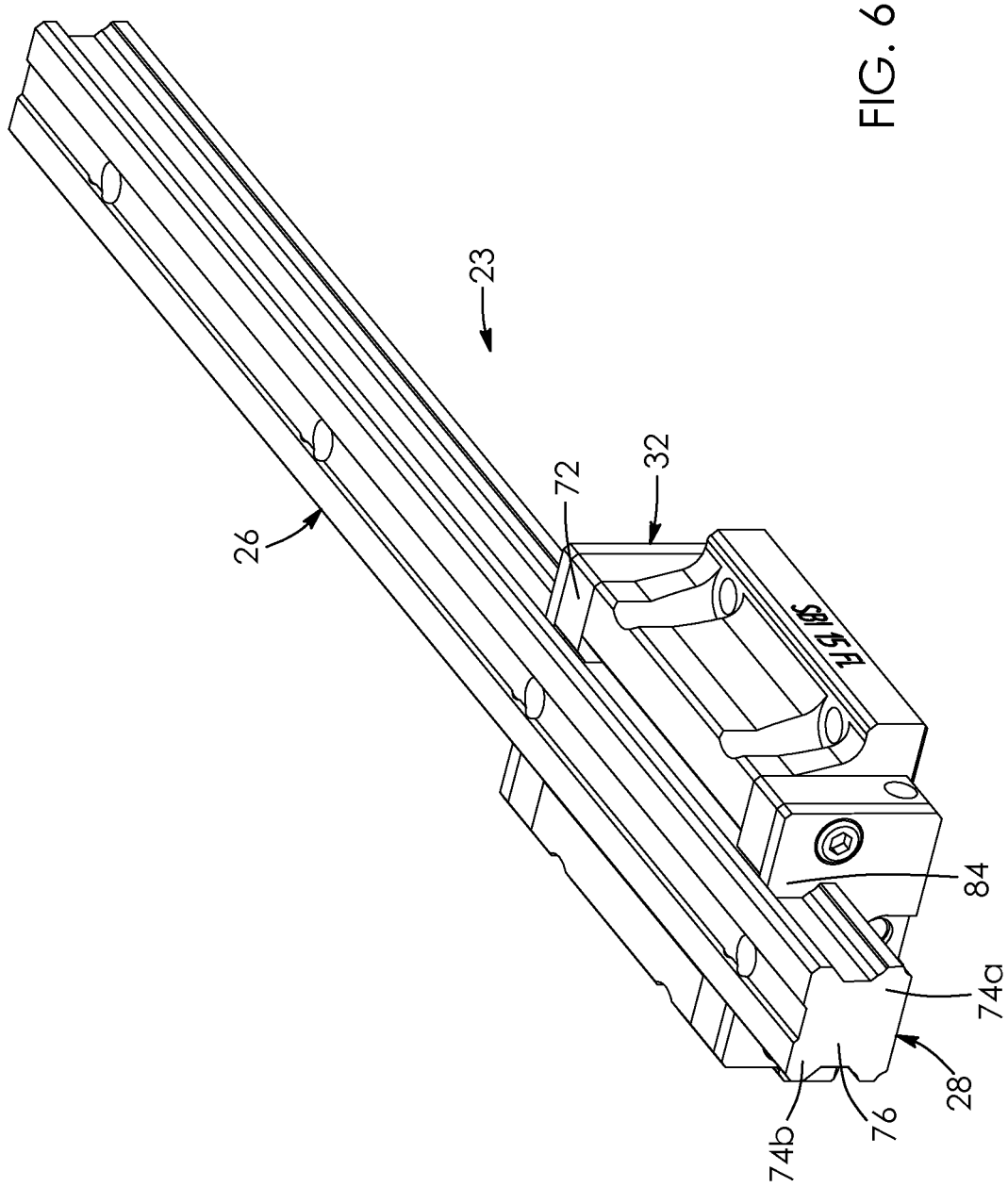
FIG. 6 is a perspective view of a guiding assembly of the workpiece cutting apparatus of FIG. 1.
Figure 7:
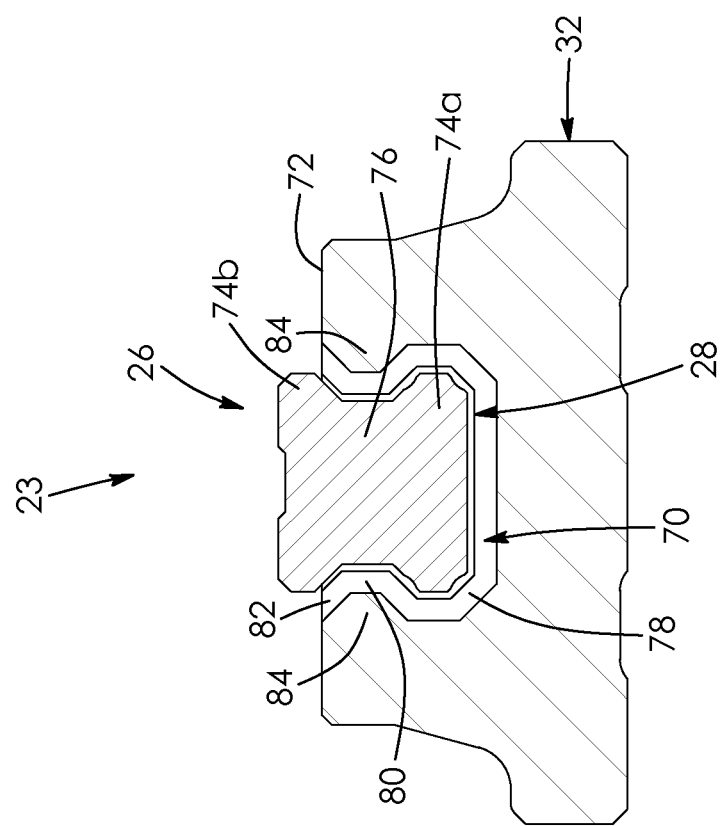
FIG. 7 is a cross-sectional view of the guiding assembly of FIG. 6.

Referring now to FIGS. 6 and 7, there is shown an embodiment of a guiding assembly 23 including a section of one of the longitudinally-extending rails 26 and a complementary engagement member 32 of the engagement arm 34 (not shown in FIGS. 6 and 7). The engagement member 32 is mounted to a distal end of the engagement arm 34 and is designed to be complementary to and engageable with a lower section of the longitudinally-extending rail 26. Both guiding assemblies being similar, only one will be described.

The engagement member 32 comprises an elongated cavity 70 extending downwardly from an upper face 72 of the engagement member 32. A lower section of the rail 26 is engaged in the elongated cavity 70 for guiding the displacement of the elongated cutting assembly support 35 of the bridge along the rail 26. The cross-sectional shape of the elongated cavity 70 is complementary to the cross-sectional shape of the engagement surface 28 of the rail 26. The rail 26 has a substantially "8-shaped" cross-section with bulges 74a, 74b at the upper and lower ends and a narrower central section 76. The engagement member 32 is engageable with the lower section of the rail 26 while the upper section or upper face of the rail 26 is securable to the rail support 27, mounted to the cutting table 20 or on any other suitable support. The elongated cavity 70 has a substantially complementary shape to the rail 26 with a wider lower section 78, complementary to the lower bulge 74a of the rail 26, a narrower intermediate section 80, complementary to the narrower central section 76 of the rail 26, and an upper section 82 opening outwardly on the upper face 72, complementary to a section of the upper bulge 74b of the rail 26. The narrower intermediate section 80 is defined by two elongated retaining protrusions 84 extending inwardly from opposed faces defining the elongated cavity 70 in the engagement member 32. The insertion of the elongated retaining protrusions 84 between the bulges 74a, 74b of the rail 26 secures the engagement member 32 with the rail 26 while allowing displacement of the engagement member 32 along the rail 26. The elongated retaining protrusions 84 are substantially aligned with the narrower central section 76 of the rail 26. The internal spacing between the two proximal ends of the elongated retaining protrusions 84 being narrower than a width of the lower bulge 74a of the rail 26, the engagement member 32 cannot be disengaged from the rail 26 without sliding it towards one of the ends of the rail 26. Thus, to be engageable with the downwardly oriented engagement surface 28, the bridge engagement member 32 comprises the elongated cavity 70 extending downwardly from the upper face 72 and being complementary in shape with the rail 26 and including elongated retaining protrusions 84 preventing disengagement of the bridge engagement member 32 from the rail 26 during displacement.

It is appreciated that the shape and the configuration of the guiding assembly 23 can differ from the one shown in FIGS. 6 and 7.

Referring back to FIGS. 4 and 5 and as mentioned above, a driving assembly 50 is provided for each one of the engagement arm 34 and controls the displacement of the corresponding one of the engagement arm 34. In the embodiment shown, each engagement arm 34 is driven by a rack and pinion assembly 52, where the rotative movement of the pinion is controlled by an actuator 54, such as a motor. In the embodiment shown, the rack and pinion assembly 52 is also inverted, such that the rack and pinion assembly 52 is positioned below a section of the rail support 27 which supports the longitudinally-extending rail 26, and is thereby protected. In more details, the rack 52a extends over the length of the longitudinally-extending rail 26 and is substantially parallel thereto, while the pinion 52b operatively engages the rack 52a to displace the engagement arm 34 in a displacement direction along the longitudinally-extending rail 26, upon rotation of the pinion 52b by the actuator 54. The rotational direction of the pinion dictates the displacement direction of the engagement arm 34. One skilled in the art will understand that, while the rack 52a faces downward in the embodiment shown, in an alternative embodiment, the rack 52a could also face sideways. Or course, modification to the orientation of the rack would require a corresponding modification to the orientation of the pinion 52b.

One skilled in the art will understand that, in an alternative embodiment, the driving assemblies 50 can differ from the above-described rack and pinion assembly 52. Moreover, the configuration and positioning of the driving assemblies 50 can differ from the embodiment shown.

Referring to FIG. 1, in accordance with the embodiment shown, the cutting apparatus 10 further includes a controller 62, which is operative for controlling operations of the cutting apparatus 10. In an embodiment, the controller is a computer numeric controlled (CNC) controller. The controller 62 is connected to each one of the cutting assembly, the X-axis actuator 44, the Z-axis actuator 46 and the driving assemblies 50 of the bridge 30 such to control the displacement of the components and the cutting operations. The controller 62 includes suitable controls, such as a computer processor, associated software modules and the like, for carrying out the operations of the cutting apparatus 10. Some of the operations carried out by the cutting apparatus 10 in response to instructions provided by the controller 62 are described below.

Advantageously, the above described inverted longitudinally-extending rails 26 on opposed sides of the cutting table 20, each being engaged, from below, by engagement member 32 of a corresponding one of the engagement arms 34 of the bridge 30 results in an assembly which allows quick movement of the bridge 30 about the rail 26 while preventing misalignment of the bridge about the cutting table 20 to allow precise cutting of the workpieces. Moreover, such a configuration of the longitudinally-extending rails 26 and engagement member 32 of the corresponding one of the engagement arms 34 protects important components of the cutting apparatus 10, such as the engagement surface 28 of the rails 26 and the rack and pinion assemblies 52 (or any other suitable driving assemblies) by preventing exposition to dirt and debris resulting from cutting of workpieces by the apparatus 10, as well as accidental impact with external objects.

The cutting apparatus for cutting workpieces having been described above, a method for cutting workpieces using the above described apparatus, according to an embodiment, will now be described. The method includes the initial step of positioning the workpiece on the receiving surface 22 of the cutting table 20. Subsequently, in order to perform the cutting of the workpiece, the cutting assembly 40 is moved along at least a first X-axis, about the elongated cutting assembly support 35 of the bridge 30. As previously mentioned, the cutting assembly 40 can also be moved along an additional Z-axis about the bridge 30. The method also includes displacing the bridge 30 about the Y-axis, along the at least two longitudinal rails 26. The displacement of the bridge 30 is performed by engaging engagement arms 34 of the bridge 30 respectively with a corresponding one of the longitudinal rails 26. As previously described, the engagement occurs from below. In an embodiment, a driving assembly 50 is provided for each one of the engagement arms 34 of the bridge 30 such that displacement of the bridge 30 about the at least two longitudinal rails 26 is performed by driving each one of the engagement arms 34 in a displacement direction using the corresponding driving assembly 50, such as the rack and pinion assembly 52 described above.

Moreover, a method for assembly of the cutting apparatus, according to an embodiment, will also be described. The method includes the initial step of providing a cutting table 20 having a workpiece receiving surface 22 and a subsequent step of configuring the cutting table 20 such as to position the workpiece receiving surface 22 in a spaced-apart relationship with the ground or any other supporting surface 21. Longitudinally-extending rails 26 having an engagement surface 28 are also mounted to the cutting table 20 such that the engagement surfaces 28 of the rail members 26 face downwardly and the rails 26 are spaced-apart from one another and extend parallel to one another. In an embodiment, each one of the rails 26 is mounted on a respective side of the cutting table. The method further includes engaging a bridge engagement member 32 of a bridge 30 with each one of the rails 26 thereby forming bridge engagement member and rail assemblies, an elongated cutting assembly support 35 of the bridge 30 extending above the workpiece receiving surface 22 of the cutting table 20, and engaging driving assemblies 50 with each one of the bridge engagement member 32 and rail assemblies. The driving assemblies 50 are actuable to engage the bridge 30 in translation along the rails 26. In an embodiment, the method also includes mounting a cutting assembly 40 on the elongated cutting assembly support 35 of the bridge 30. The method can also include connecting each one of the driving assemblies 50 to the controller 62 in a manner such that each one of the driving assemblies 50 can be actuable simultaneously to displace the bridge engagement members 32 along the rails 26 in the same direction and at the same speed.

Figure 8:
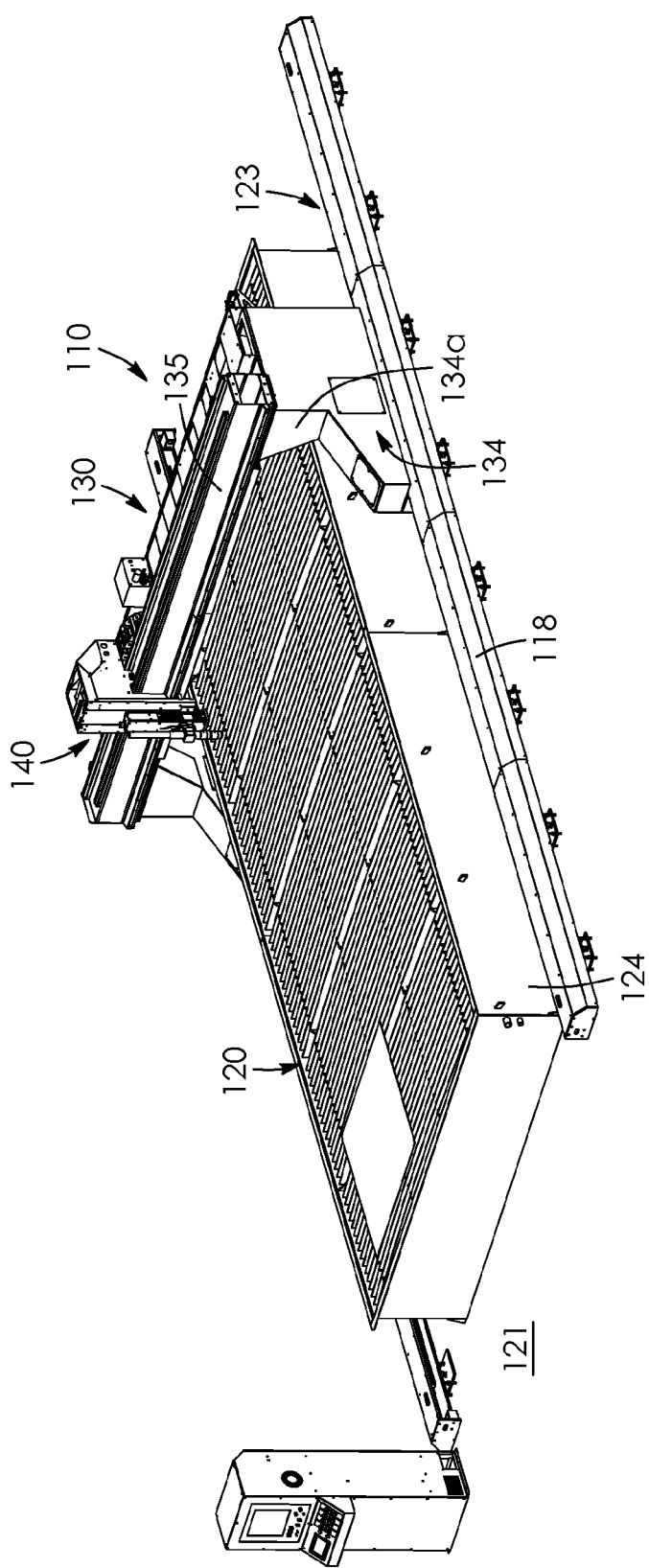
FIG. 8 is a perspective view of a workpiece cutting apparatus including a workpiece cutting table, in accordance with another embodiment wherein longitudinal rails of the guiding assembly are supported on the ground.

Alternative embodiments to the above described workpiece cutting apparatus including a guiding assembly can be foreseen. For instance and without being limitative, FIG. 8 shows an alternative embodiment to the workpiece cutting apparatus shown in FIGS. 1 to 5, wherein the features are numbered with reference numerals in the 100 series which correspond to the reference numerals of the previous embodiment. The workpiece cutting apparatus 110 comprises a guiding assembly 123 wherein the longitudinal rails (not shown—hidden by protective cover 118) are mounted to a supporting surface 121, such as a floor or the ground, on each side of the cutting table 120, but are not engaged with the cutting table 120.

Once again, each one of the longitudinally-extending rails has a rail engagement surface 128 to engage the bridge engagement member 132 of the engagement arm 134 of the bridge 130 and allow displacement of the corresponding end of the bridge 130 along the length of the corresponding longitudinally-extending rail. The bridge engagement member 132 is provided at the distal end of the second section 134*b* of the engagement arm 134. In the embodiment shown in FIG. 8, the second section 134*b* of the engagement arm 134 extends horizontally and outwardly from the lower end of the first section 134*a*, i.e. towards the longitudinally-extending rails and opposite to the cutting table 120. Thus, the engagement arm 134 extends between the side surfaces 124 of the cutting table 120 and the respective one of the longitudinally-extending rails.

As for the above-described embodiment, the rails are inverted, relative to a normal upward-facing configuration, such that the engagement surface 128 is oriented substantially downwardly, i.e. towards the supporting surface 121. To be engageable with the downwardly oriented engagement surface 128, the bridge engagement member 132 comprises a rail engaging surface facing upwardly. The guiding assembly 123 including the bridge engagement member 132 can be similar or different from the one described above in reference to FIGS. 6 and 7.

In some implementations, the workpiece cutting apparatus 10, 110 is conceived to cut planar workpieces. The cutting assembly 40, 140 can include, for instance, plasma, waterjet or laser cutting assemblies.

In the workpiece cutting apparatus 10, 110, the weight of the bridge 30, 130 including the cutting assembly 40, 140 is located above the guiding assembly 23, 123, but is transferred to the longitudinally-extending rails from below since the rail engagement surface 128 of the longitudinally-extending rails faces downwardly.

Several alternative embodiments and examples have been described and illustrated herein. The embodiments of the invention described above are intended to be exemplary only. A person skilled in the art would appreciate the features of the individual embodiments, and the possible combinations and variations of the components. A person skilled in the art would further appreciate that any of the embodiments could be provided in any combination with the other embodiments disclosed herein. It is understood that the invention may be embodied in other specific forms without departing from the central characteristics thereof. The present examples and embodiments, therefore, are to be considered in all respects as illustrative and not restrictive, and the invention is not to be limited to the details given herein. Accordingly, while specific embodiments have been illustrated and described, numerous modifications come to mind without significantly departing from the scope of the invention as defined in the appended claims.

The invention claimed is:

1. A workpiece cutting apparatus comprising:
a cutting table with a workpiece receiving surface;
at least two longitudinally-extending rails extending longitudinally on opposed sides of the cutting table and extending substantially parallel to one another, each one of the longitudinally-extending rails having a lower section and an upper section, the lower section having a rail engagement surface oriented substantially downwardly that faces away from the workpiece receiving surface;
a bridge comprising an elongated cutting assembly support and engagement arms extending at opposed ends of the elongated cutting assembly support, each one of the engagement arms comprising a bridge engagement member being engageable with the lower section of a corresponding one of the at least two longitudinally-extending rails, from below, to perform longitudinal displacement of the bridge along the longitudinally-extending rails, a weight of the bridge being transferred to the lower section of each of the longitudinal rails; and
at least two driving assemblies, each one of the driving assemblies operatively connecting each one of the engagement arms to the corresponding one of the at least two longitudinally-extending rails, the at least two driving assemblies being actuable to translate the engagement arms along the at least two longitudinally-extending rails;
wherein the bridge engagement member of each of the engagement arms comprises an upper face, the bridge engagement member comprising an elongated cavity opening on the upper face, the elongated cavity being complementary in shape with the lower section of a corresponding one of the longitudinally-extending rails.

2. The workpiece cutting apparatus of claim 1, wherein the cutting table comprises side surfaces extending downwardly from the workpiece receiving surface and wherein the at least two longitudinally-extending rails are connected to opposed one of the side surfaces of the cutting table, below the workpiece receiving surface.

3. The workpiece cutting apparatus of claim 2, further comprising rail supports having a lower surface, the rail supports being mounted to a respective one of the side surfaces and extending outwardly therefrom, and extending below the workpiece receiving surface, the at least two longitudinally-extending rails being secured to the lower surface of the respective one of the rail supports.

4. The workpiece cutting apparatus of claim 1, further comprising a supporting surface supporting the cutting table and extending below the workpiece receiving surface, the at least two longitudinally-extending rails being secured to the supporting surface, on opposite sides of the cutting table.

5. The workpiece cutting apparatus of claim 1, further comprising a controller operatively connected to the at least two driving assemblies to synchronize a displacement direction and speed of the engagement arms along the at least two longitudinally-extending rails.

6. The workpiece cutting apparatus of claim 1, further comprising a cutting assembly mounted to the elongated cutting assembly support of the bridge and being displaceable therealong, above the workpiece receiving surface.

7. The workpiece cutting apparatus of claim 6, wherein the cutting assembly is one of a plasma torch, a water jet and a laser.

8. The workpiece cutting apparatus of claim 1, wherein the engagement arms comprises a first section extending downwardly from the elongated cutting assembly support and a second section extending inwardly from a lower end of the first section towards the cutting table, each one of the bridge engagement members being mounted to a respective one of the second sections of the engagement arms.

9. The workpiece cutting apparatus of claim 8, wherein the bridge engagement members extend upwardly from the second sections of the engagement arms.

10. A workpiece cutting apparatus comprising:
a cutting table having a workpiece receiving surface;
at least two longitudinally-extending rails provided on opposed sides of the cutting table, each one of the longitudinally-extending rails having a lower section and an upper section, the lower section having a rail engagement surface oriented substantially downwardly that faces away from the workpiece receiving surface;
a bridge having a cutting assembly mounted to a section thereof and being operatively engageable with the lower section of each of the at least two longitudinally-extending rails, from below, the cutting assembly being disposed above the workpiece receiving surface, the lower section of each of the longitudinal rails supporting a weight of the bridge; and
at least two driving assemblies, each one of the driving assemblies operatively connecting a respective end of the bridge to each one of the at least two longitudinally-extending rails, the at least two driving assemblies being actuable to perform longitudinal displacement of the bridge along the at least two longitudinally-extending rails to move the cutting assembly above the workpiece receiving surface;
wherein the bridge comprises a bridge engagement member comprising an upper face, the bridge engagement member comprising an elongated cavity opening on the upper face, the elongated cavity being complementary in shape with the lower section of a corresponding one of the longitudinally-extending rails.

11. The workpiece cutting apparatus of claim 10, wherein the at least two longitudinally-extending rails extend substantially parallel to one another and comprise a rail engagement surface oriented substantially downwardly.

12. The workpiece cutting apparatus of claim 10, wherein the bridge comprises an elongated cutting assembly support with the cutting assembly being operatively connected thereto and engagement arms extending at opposed ends of the elongated cutting assembly support, each one of the engagement arms comprising a bridge engagement member being engageable with a corresponding one of the at least two longitudinally-extending rails, from below.

13. The workpiece cutting apparatus of claim 12, wherein the engagement arms comprise a first section extending downwardly from the elongated cutting assembly support and a second section extending inwardly from a lower end of the first section towards the cutting table, each one of the bridge engagement members being mounted to a respective one of the second sections of the engagement arms.

14. The workpiece cutting apparatus of claim 13, wherein the bridge engagement members extend upwardly from the second sections of the engagement arms.

15. The workpiece cutting apparatus of claim 10, wherein the cutting table comprises side surfaces extending downwardly from the workpiece receiving surface and wherein the at least two longitudinally-extending rails are connected to opposed one of the side surfaces of the cutting table, below the workpiece receiving surface.

16. The workpiece cutting apparatus of claim 15, further comprising rail supports having a lower surface, the rail supports being mounted to a respective one of the side surfaces and extending outwardly therefrom, and extending below the workpiece receiving surface, the at least two longitudinally-extending rails being secured to the lower surface of the respective one of the rail supports.

17. The workpiece cutting apparatus of claim 10, further comprising a supporting surface supporting the cutting table and extending below the workpiece receiving surface, the at least two longitudinally-extending rails being secured to the supporting surface, on opposite sides of the cutting table.

18. The workpiece cutting apparatus of claim 10, further comprising a controller operatively connected to the at least two driving assemblies to synchronize a displacement direction and speed of the respective ends of the bridge along the at least two longitudinally-extending rails.

19. The workpiece cutting apparatus of claim 10, wherein the cutting assembly is one of a plasma torch, a water jet and a laser.

20. A method for cutting a workpiece using a workpiece cutting apparatus, the workpiece cutting apparatus comprising a cutting table with a workpiece receiving surface, a pair of longitudinally-extending rails provided on opposed sides of the cutting table, a bridge comprising a cutting assembly disposed above the workpiece receiving surface, the bridge comprising a bridge engagement member having an upper face and an elongated cavity opening on the upper face, the bridge engagement member being operatively engaged with a lower section of each the longitudinally-extending rails, the elongated cavity being complementary in shape with the lower section of a corresponding one of the longitudinally-extending rails, the method comprising the steps of:
  positioning the workpiece on the receiving surface of the cutting table;
  displacing the cutting assembly along at least a first axis about the bridge;
  displacing the bridge along a second axis about the at least two longitudinally-extending rails, the displacement of the bridge being performed by engaging respective ends of the bridge respectively with the lower section of a corresponding one of the at least two longitudinally-extending rails, from below, engagement surfaces from the lower section of the rails facing away from the workpiece receiving surface, and driving each one of the respective ends of the bridge in a displacement direction using a corresponding one of at least two driving assemblies, a weight of the bridge being transferred to the lower section of each of the longitudinally-extending rails; and
  cutting the workpiece while displacing at least one of the cutting assembly and the bridge.

21. A method for assembling a workpiece cutting apparatus, the method comprising:
  providing a cutting table having a workpiece receiving surface;
  configuring the cutting table to space apart the workpiece receiving surface from a supporting surface;
  mounting longitudinally-extending rails having an engagement surface close to the cutting table with the engagement surfaces of the longitudinally-extending rails facing downwardly, the rail engagement surfaces facing away from the workpiece receiving surface, and the longitudinally-extending rails being spaced-apart from one another and extending substantially parallel to one another;
  engaging bridge engagement members of a bridge with lower sections of each one of the longitudinally-extending rails to form bridge engagement member and rail assemblies, with the bridge extending above the workpiece receiving surface of the cutting table while a weight of the bridge is transferred to the lower section of each of the longitudinally-extending rails, each bridge engagement member having and upper face and comprising an elongated cavity opening on the upper face, the elongated cavity being complementary in shape with the lower section of a corresponding one of the longitudinally-extending rails; and
  engaging driving assemblies with each one of the bridge engagement members and rail assemblies, the driving assemblies being actuable to engage the bridge in translation along the longitudinally-extending rails.

22. The method of claim 20, wherein mounting the longitudinally-extending rails comprises mounting the longitudinally-extending rails to the cutting table on a respective side thereof.

23. The method of claim 20, further comprising mounting a cutting assembly on an elongated cutting assembly support of the bridge.

24. The method of claim 20, further comprising connecting each one of the driving assemblies to a controller to synchronize actuation of the driving assemblies and displacement of the bridge engagement members along the longitudinally-extending rails in a same direction and at a same speed.

25. The workpiece cutting apparatus according to claim 1, wherein the lower and upper sections of each of the longitudinally-extending rails form lower and upper bulges, each rail having a narrower central section between the lower and upper bulges, the elongated cavity of the bridge engagement member having a wider lower section, complementary to the lower bulge of a corresponding one of the longitudinally-extending rails.

26. The workpiece cutting apparatus according to claim 10, wherein the lower and upper sections of each of the longitudinally-extending rails form lower and upper bulges, each rail having a narrower central section between the lower and upper bulges, the elongated cavity of the bridge engagement member having a wider lower section, complementary to the lower bulge of a corresponding one of the longitudinally-extending rails.

27. The workpiece cutting apparatus according to claim 1, wherein each of the longitudinally-extending rail is covered by a protective cover extending above the rail.

28. The workpiece cutting apparatus according to claim 10, wherein each of the longitudinally-extending rail is covered by a protective cover extending above the rail.

* * * * *

UNITED STATES PATENT AND TRADEMARK OFFICE
CERTIFICATE OF CORRECTION

PATENT NO. : 9,718,148 B2  
APPLICATION NO. : 14/454396  
DATED : August 1, 2017  
INVENTOR(S) : Giguère Page 1 of 2

It is certified that error appears in the above-identified patent and that said Letters Patent is hereby corrected as shown below:

In the Specification

Column 2, Line 37:
"comprises" should be — comprise —

Column 5, Line 17:
"transversally" should be — transversely —

Column 5, Line 23:
"plan" should be — plane —

Column 6, Line 54:
"arm" should be — arms —

Column 6, Line 59:
"extend" should be — extends —

Column 6, Line 66:
"arm" should be — arms —

Column 7, Line 17:
After "will" insert -- be --

Column 8, Lines 46, 47:
"arm" should be — arms —

Column 8, Line 65:
"Or" should be — Of —

Signed and Sealed this  
Twenty-fourth Day of April, 2018

Andrei Iancu  
*Director of the United States Patent and Trademark Office*

CERTIFICATE OF CORRECTION (continued)
U.S. Pat. No. 9,718,148 B2

Column 9, Line 21:
"above described" should be — above-described —

Column 9, Line 40:
"above described" should be — above-described —

Column 10, Line 26:
"above described" should be — above-described —

In the Claims

Column 12, Claim 8, Line 26:
"comprises" should be — comprise —

Column 14, Claim 21, Line 22:
"spaced-apart" should be — spaced apart —

Column 15, Claim 27, Line 4:
"rail" should be — rails —

Column 15, Claim 28, Line 7:
"rail" should be — rails —